US012697711B2

(12) United States Patent
Quinlan et al.

(10) Patent No.: US 12,697,711 B2
(45) Date of Patent: *Aug. 4, 2026

(54) SHARED DENSE NETWORK WITH ROBOT TASK-SPECIFIC HEADS

(71) Applicant: GDM Holding LLC, Mountain View, CA (US)

(72) Inventors: Michael Quinlan, Sunnyvale, CA (US); Sean Kirmani, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,464

(22) Filed: Mar. 14, 2024

(65) Prior Publication Data

US 2024/0217091 A1 Jul. 4, 2024

Related U.S. Application Data

(63) Continuation of application No. 18/158,072, filed on Jan. 23, 2023, now Pat. No. 11,945,106, which is a
(Continued)

(51) Int. Cl.
*G06V 10/82* (2022.01)
*B25J 5/00* (2006.01)
(Continued)

(52) U.S. Cl.
CPC ............ *B25J 5/007* (2013.01); *G06F 18/214* (2023.01); *G06V 10/40* (2022.01); *G06V 10/454* (2022.01);
(Continued)

(58) Field of Classification Search
CPC ...... G06V 10/40; G06V 10/82; G06V 10/945; G06V 10/955; G06V 10/95; G06V 20/10;
(Continued)

(56) References Cited

U.S. PATENT DOCUMENTS 10,618,172 B1 * 4/2020 Diankov ................ B25J 9/1676
10,920,434 B1 * 2/2021 Pearson, Jr. ............ E04G 21/22
(Continued)

FOREIGN PATENT DOCUMENTS

CN 111046728 4/2020
DE 102018128531 5/2020
(Continued)

OTHER PUBLICATIONS

Cai et al., "Cascade R-CNN: High Quality Object Detection and Instance Segmentation," arxiv.org, Cornell University Library, aiXiv:1906.09756v1, Jun. 24, 2019, 14 pages.
(Continued)

*Primary Examiner* — Shaghayegh Azima
(74) *Attorney, Agent, or Firm* — McDonnell Boehnen Hulbert & Berghoff LLP

(57) ABSTRACT

A method includes receiving image data representing an environment of a robotic device from a camera on the robotic device. The method further includes applying a trained dense network to the image data to generate a set of feature values, where the trained dense network has been trained to accomplish a first robot vision task. The method additionally includes applying a trained task-specific head to the set of feature values to generate a task-specific output to accomplish a second robot vision task, where the trained task-specific head has been trained to accomplish the second robot vision task based on previously generated feature values from the trained dense network, where the second robot vision task is different from the first robot vision task. The method also includes controlling the robotic device to operate in the environment based on the task-specific output generated to accomplish the second robot vision task.

20 Claims, 10 Drawing Sheets

Related U.S. Application Data continuation of application No. 16/717,498, filed on Dec. 17, 2019, now Pat. No. 11,587,302.

(51) Int. Cl.

| | |
|---|---|
| *G06F 18/214* | (2023.01) |
| *G06V 10/40* | (2022.01) |
| *G06V 10/44* | (2022.01) |
| *G06V 10/764* | (2022.01) |
| *G06V 10/776* | (2022.01) |
| *G06V 10/94* | (2022.01) |
| *G06V 20/10* | (2022.01) |
| *G06V 20/64* | (2022.01) |

(52) U.S. Cl.
CPC .......... *G06V 10/764* (2022.01); *G06V 10/776* (2022.01); *G06V 10/82* (2022.01); *G06V 10/95* (2022.01); *G06V 10/955* (2022.01); *G06V 20/10* (2022.01); *G06V 20/64* (2022.01)

(58) Field of Classification Search
CPC .. G06V 10/454; G06V 10/764; G06V 10/776; G06V 20/64; G06F 18/214; B25J 5/007
See application file for complete search history.

(56) References Cited

U.S. PATENT DOCUMENTS

| | | | | |
|---|---|---|---|---|
| 11,436,751 | B2 * | 9/2022 | Ishihara | G06T 7/579 |
| 11,458,855 | B2 * | 10/2022 | Shin | B60L 53/16 |
| 11,587,302 | B2 | 2/2023 | Quinlan et al. | |
| 11,741,354 | B2 * | 8/2023 | Hotson | G06N 3/084 |
| | | | | 706/25 |
| 2016/0148104 | A1 * | 5/2016 | Itzhaky | A01G 7/00 |
| | | | | 706/12 |
| 2017/0142340 | A1 * | 5/2017 | Kishi | G06V 20/10 |
| 2018/0330166 | A1 * | 11/2018 | Redden | G06V 10/764 |
| 2018/0373937 | A1 * | 12/2018 | Shulman | H04N 7/18 |
| 2019/0119842 | A1 * | 4/2019 | Goto | B25J 19/023 |
| 2019/0147621 | A1 * | 5/2019 | Alesiani | G06T 7/73 |
| | | | | 382/190 |
| 2019/0213438 | A1 * | 7/2019 | Jones | G06V 20/10 |
| 2019/0228495 | A1 | 7/2019 | Tremblay et al. | |
| 2020/0193296 | A1 * | 6/2020 | Dixit | G06N 20/10 |
| 2020/0311962 | A1 * | 10/2020 | Yang | G06N 3/084 |
| 2020/0396900 | A1 * | 12/2020 | Xiong | A01D 46/253 |
| 2021/0023711 | A1 * | 1/2021 | Lee | B25J 9/163 |
| 2021/0023715 | A1 * | 1/2021 | Zhang | B25J 9/1692 |
| 2021/0142181 | A1 * | 5/2021 | Liu | G06N 3/045 |
| 2021/0275264 | A1 * | 9/2021 | Johnson | G16H 40/63 |
| 2022/0005332 | A1 * | 1/2022 | Metzler | G08B 13/19682 |
| 2022/0280982 | A1 * | 9/2022 | Ushpizin | B08B 1/12 |

FOREIGN PATENT DOCUMENTS

| | | | |
|---|---|---|---|
| DE | 102019102803 B4 | | 2/2022 |
| EP | 3 572 983 A1 * | | 11/2019 |

OTHER PUBLICATIONS

Gupta et al., "Learning Rich Features from RGB-D Images for Object Detection and Segmentation," "In Big data analytics in the social and ubiquitous context: 5th International Workshop on Modeling Social Media, MSM 2014, 5th International Workshop on Mining Ubiquitous and and Social Environments, MUSE 2014 and first International Workshop on Machine Learning for Urban Sensor Data, SenseML 2014: revis," Springer, 2014, pp. 345-360, vol. 8695.

Hui, Jonathan, "Understanding Feature Pyramid Networks for Object Detection," (FPN), Mar. 26, 2018, 6 pages.

Lin et al., "Feature Pyramid Networks for Object Detection," CVPR Paper, 2017, 9 pages.

Shorten, Connor, "Ensembles of Deep Networks," https://towardsdatascience.com/ensembles--0f-convolutional-networks-3f81f59978a3, January 3019, 5 pages.

Yu et al., "A Grasping CNN with Image Segmentation for Mobile Manipulating Robot," Proceeding of the IEEE International Conference on Robotics and Biometrics, 2019, pp. 1688-1692.

Minetto et al., "Hydra: An Ensemble of Convolutional Neural Networks for Geospatial Land Classification," IEEE Transactions on Geoscience and Remote Sensing, Sep. 2019, pp. 6530-6541, vol. 59, No. 9.

* cited by examiner

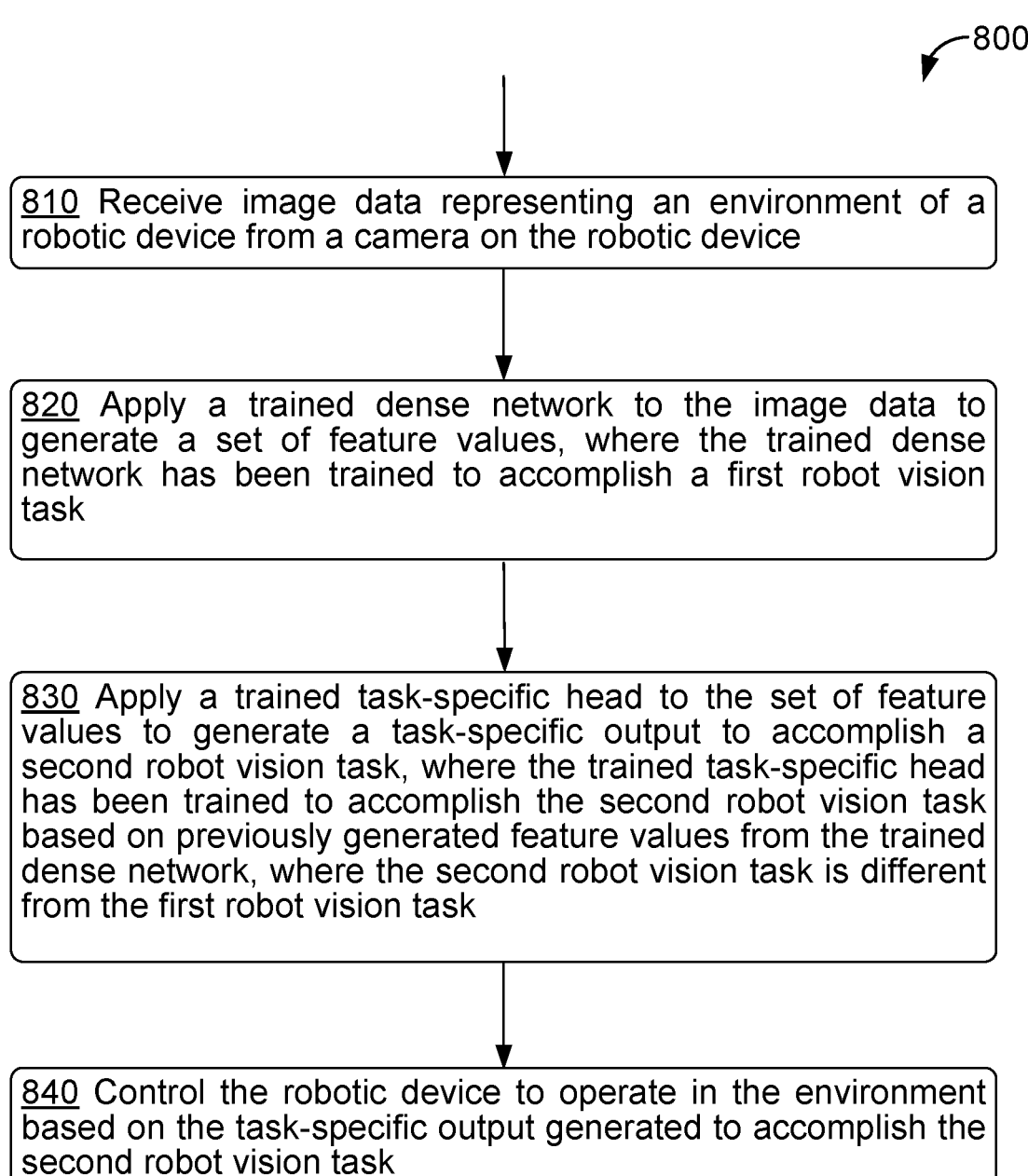

810 Receive image data representing an environment of a robotic device from a camera on the robotic device 820 Apply a trained dense network to the image data to generate a set of feature values, where the trained dense network has been trained to accomplish a first robot vision task 830 Apply a trained task-specific head to the set of feature values to generate a task-specific output to accomplish a second robot vision task, where the trained task-specific head has been trained to accomplish the second robot vision task based on previously generated feature values from the trained dense network, where the second robot vision task is different from the first robot vision task 840 Control the robotic device to operate in the environment based on the task-specific output generated to accomplish the second robot vision task

Figure 8

SHARED DENSE NETWORK WITH ROBOT TASK-SPECIFIC HEADS

CROSS-REFERENCE TO RELATED DISCLOSURE

This application is a continuation of U.S. patent application Ser. No. 18/158,072, filed on Jan. 23, 2023, which is a continuation of U.S. patent application Ser. No. 16/717,498, filed on Dec. 17, 2019, which are incorporated herein by reference in their entirety.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Example embodiments involve a shared dense network such as a feature pyramid network (FPN) that is combined with task-specific heads to accomplish different robot vision tasks.

In an embodiment, a method includes receiving image data representing an environment of a robotic device from a camera on the robotic device. The method further includes applying a trained dense network to the image data to generate a set of feature values, where the trained dense network has been trained to accomplish a first robot vision task. The method additionally includes applying a trained task-specific head to the set of feature values to generate a task-specific output to accomplish a second robot vision task, where the trained task-specific head has been trained to accomplish the second robot vision task based on previously generated feature values from the trained dense network, where the second robot vision task is different from the first robot vision task. The method also includes controlling the robotic device to operate in the environment based on the task-specific output generated to accomplish the second robot vision task.

In another embodiment, a robotic device includes a camera and a control system configured to receive image data representing an environment of the robotic device from the camera on the robotic device. The control system may be further configured to apply a trained dense network to the image data to generate a set of feature values, where the trained dense network has been trained to accomplish a first robot vision task. The control system may additionally be configured to apply a trained task-specific head to the set of feature values to generate a task-specific output to accomplish a second robot vision task, where the trained task-specific head has been trained to accomplish the second robot vision task based on previously generated feature values from the trained dense network, where the second robot vision task is different from the first robot vision task. The control system may also be configured to control the robotic device to operate in the environment based on the task-specific output generated to accomplish the second robot vision task.

In a further embodiment, a non-transitory computer readable medium is provided which includes programming instructions executable by at least one processor to cause the at least one processor to perform functions. The functions include receiving image data representing an environment of a robotic device from a camera on the robotic device. The functions further include applying a trained dense network to the image data to generate a set of feature values, where the trained dense network has been trained to accomplish a first robot vision task. The functions additionally include applying a trained task-specific head to the set of feature values to generate a task-specific output to accomplish a second robot vision task, where the trained task-specific head has been trained to accomplish the second robot vision task based on previously generated feature values from the trained dense network, where the second robot vision task is different from the first robot vision task. The functions also include controlling the robotic device to operate in the environment based on the task-specific output generated to accomplish the second robot vision task.

In another embodiment, a system is provided that includes means for receiving image data representing an environment of a robotic device from a camera on the robotic device. The system further includes means for applying a trained dense network to the image data to generate a set of feature values, where the trained dense network has been trained to accomplish a first robot vision task. The system additionally includes means for applying a trained task-specific head to the set of feature values to generate a task-specific output to accomplish a second robot vision task, where the trained task-specific head has been trained to accomplish the second robot vision task based on previously generated feature values from the trained dense network, where the second robot vision task is different from the first robot vision task. The system also includes means for controlling the robotic device to operate in the environment based on the task-specific output generated to accomplish the second robot vision task.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 8 is a block diagram of a method, in accordance with example embodiments.

DETAILED DESCRIPTION

Figure 1:
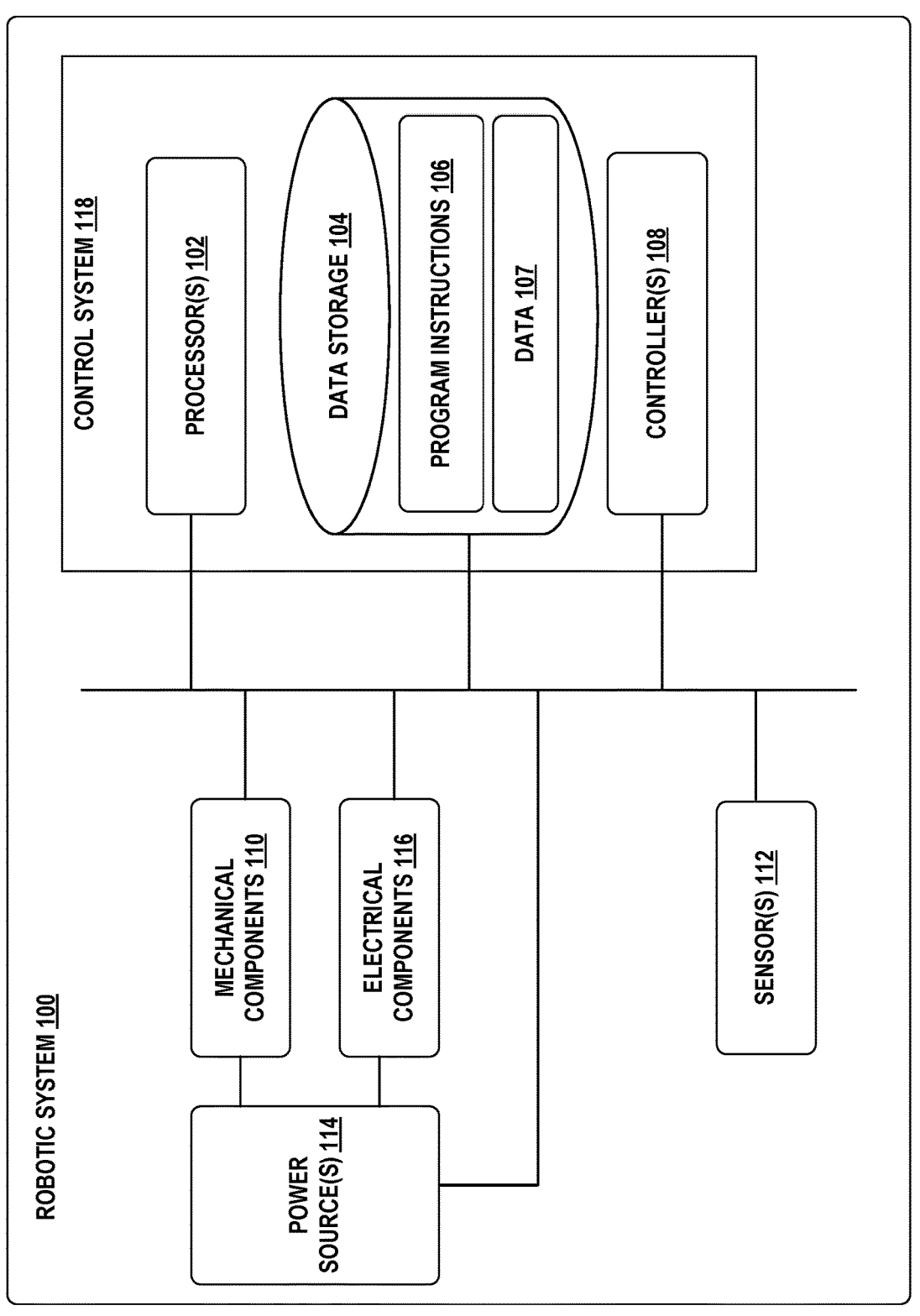
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

A robot may process image data in order to determine how to operate in an environment. The robot may perform a variety of different tasks, and each task may require different information about the environment. As an example, the robot may need to identify areas of the environment for the robot to tidy up, for instance, by clearing empty dishes. As another example, the robot may need to identify different types of disposable objects in order to sort the objects into appropriate trash or recycling bins. As a further example, the robot may need to identify a door handle in order to enter or exit an area. Different robot tasks may be associated with different robot vision tasks, where each robot vision task involves processing image data to acquire specific information needed to accomplish a corresponding robot task.

For many such robot vision tasks, machine learning may be used to train and control the robot. In order to employ a machine learned model such as a neural network in an efficient manner, a robot vision stack may be optimized. More specifically, a robot vision system may be designed to allow for automatic training and deployment, while minimizing the need for a human in the loop and also minimizing the latency between data gathering and seeing results. Additionally, a robot vision system may be designed to optimize performance quality while reducing compute resources utilized by the robot at runtime. Further, a robot vision system may be designed to reduce complexity while also making the system more powerful, more maintainable, and more flexible to respond to changing demands.

With such goals in mind, example robot vision systems described herein involve a single shared dense network (e.g., an FPN) that is combined with task-specific heads to accomplish different robot vision tasks. Sharing a single dense network enables the heavy computation to be done only once per image while each head allows specific task optimizations. Rather than train a separate network for each task, a dense network (e.g., hundreds of layers) may be trained to extract features from many images that the robot or a similar robot has captured. Separate additions may then be added for task-specific applications as needed. The dense network may only need to be trained infrequently (e.g., monthly or quarterly or yearly). New task-specific heads may only require a few layers and therefore can be trained quickly.

In some examples, the shared dense network may initially be trained to produce a task-specific output based on image data in order to accomplish a first robot vision task, which may also be referred to a seed task. For example, the first robot vision task may involve identifying areas in the environment should be tidied by the robot. As part of that training process, the shared dense network may be trained to produce a rich set of feature values after training on many images. These feature values may then be leveraged to facilitate the training of task-specific heads to accomplish other tasks in the same general space of robot perception tasks. For instance, a task-specific head may be trained to identify aspects of the environment which are manipulatable by the robot in a different way, such as identifying objects graspable by a gripper of the robot. As another example, perception tasks that are logically more distant from the initial seed task may also benefit from the previous training. For instance, a different task-specific head may be trained to provide output to assist with a task that involves the robot in a different way, such as identifying an object currently in the robot's gripper.

Example frameworks described herein may therefore be extended to leverage previous training to accomplish a wide variety of different robot perception tasks, while minimizing both the additional training needed as well as the compute resources needed by the robot to accomplish the tasks.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
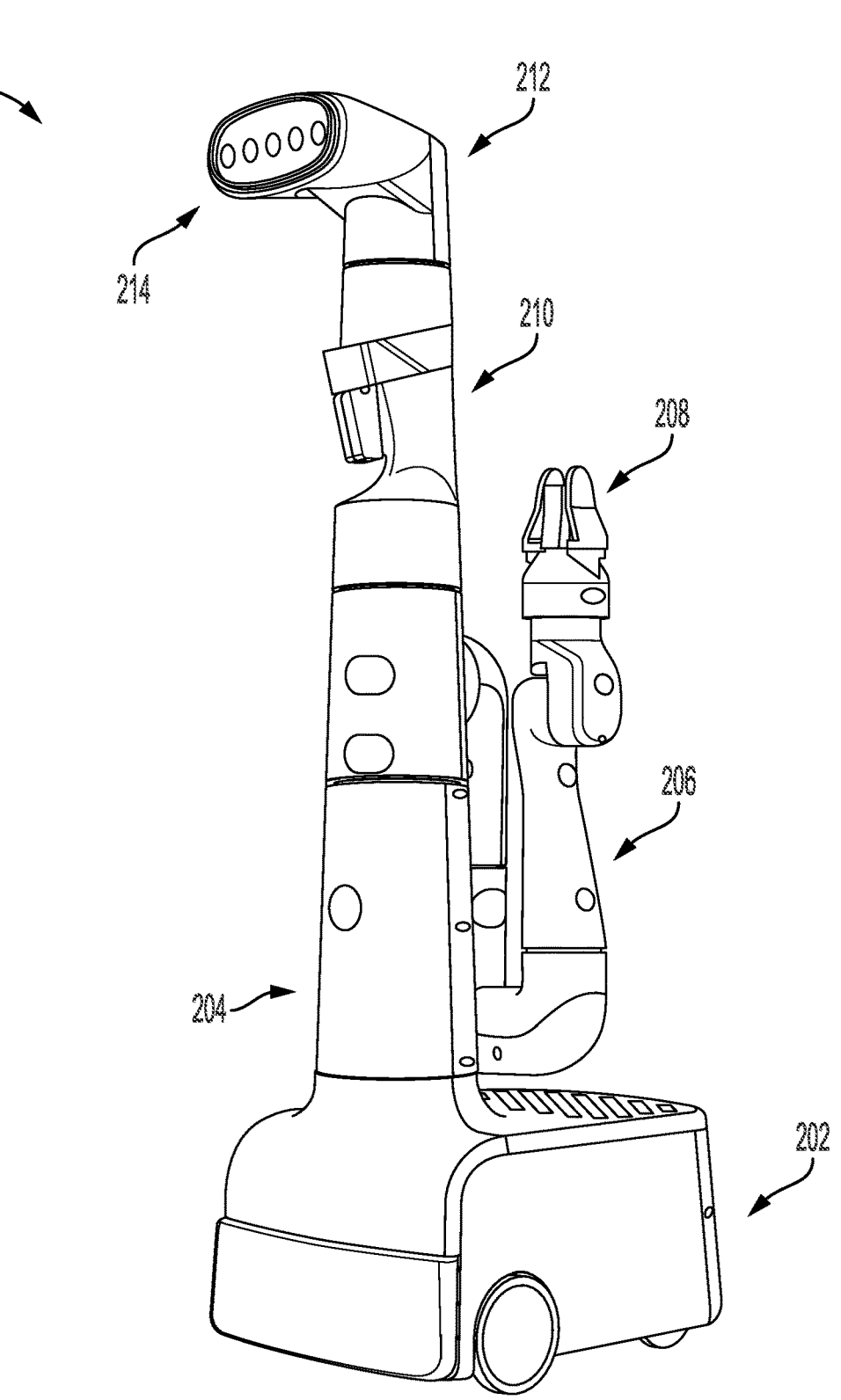
FIG. 2 illustrates a mobile robot, in accordance with example embodiments.
Figure 3:
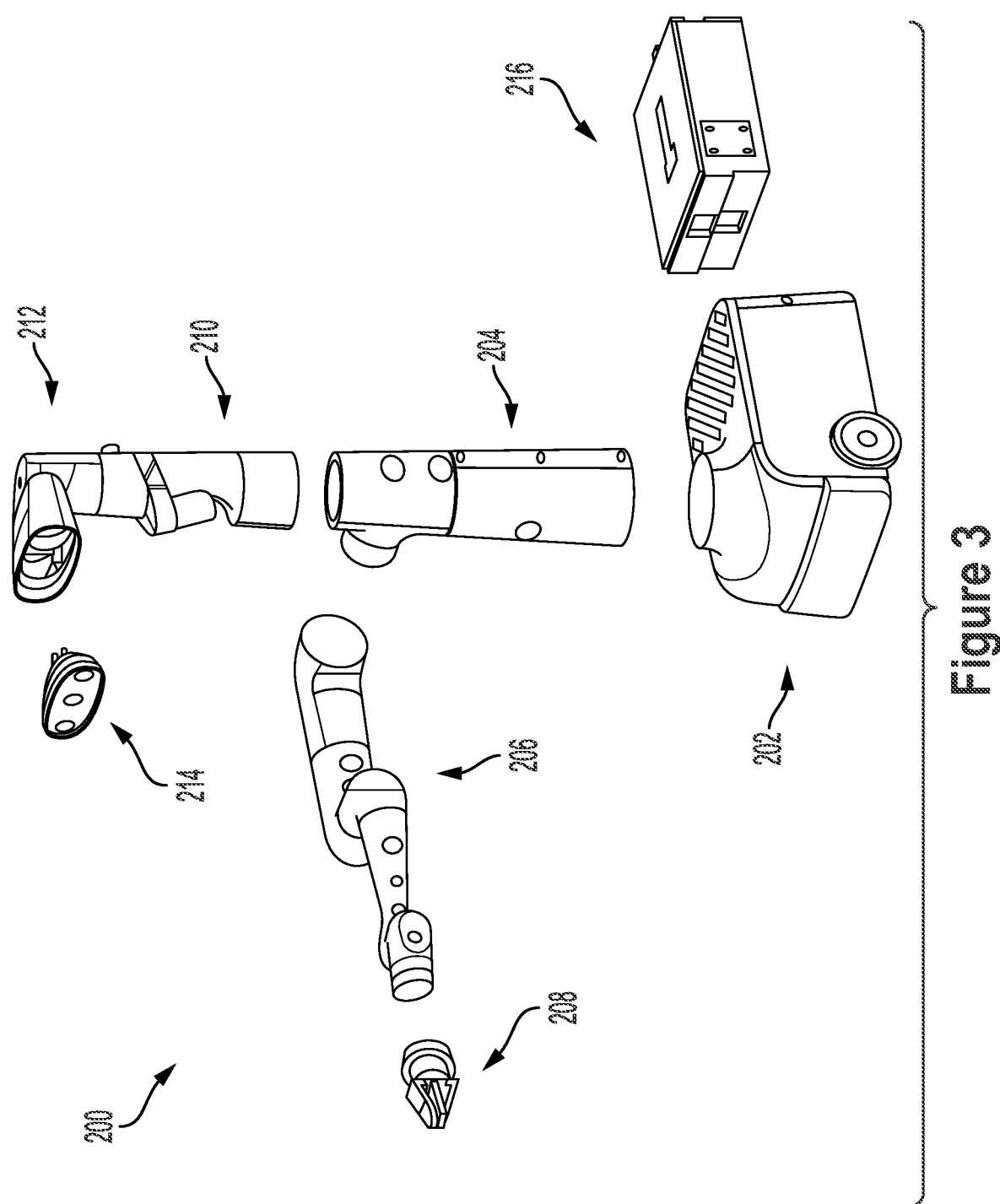
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared(IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
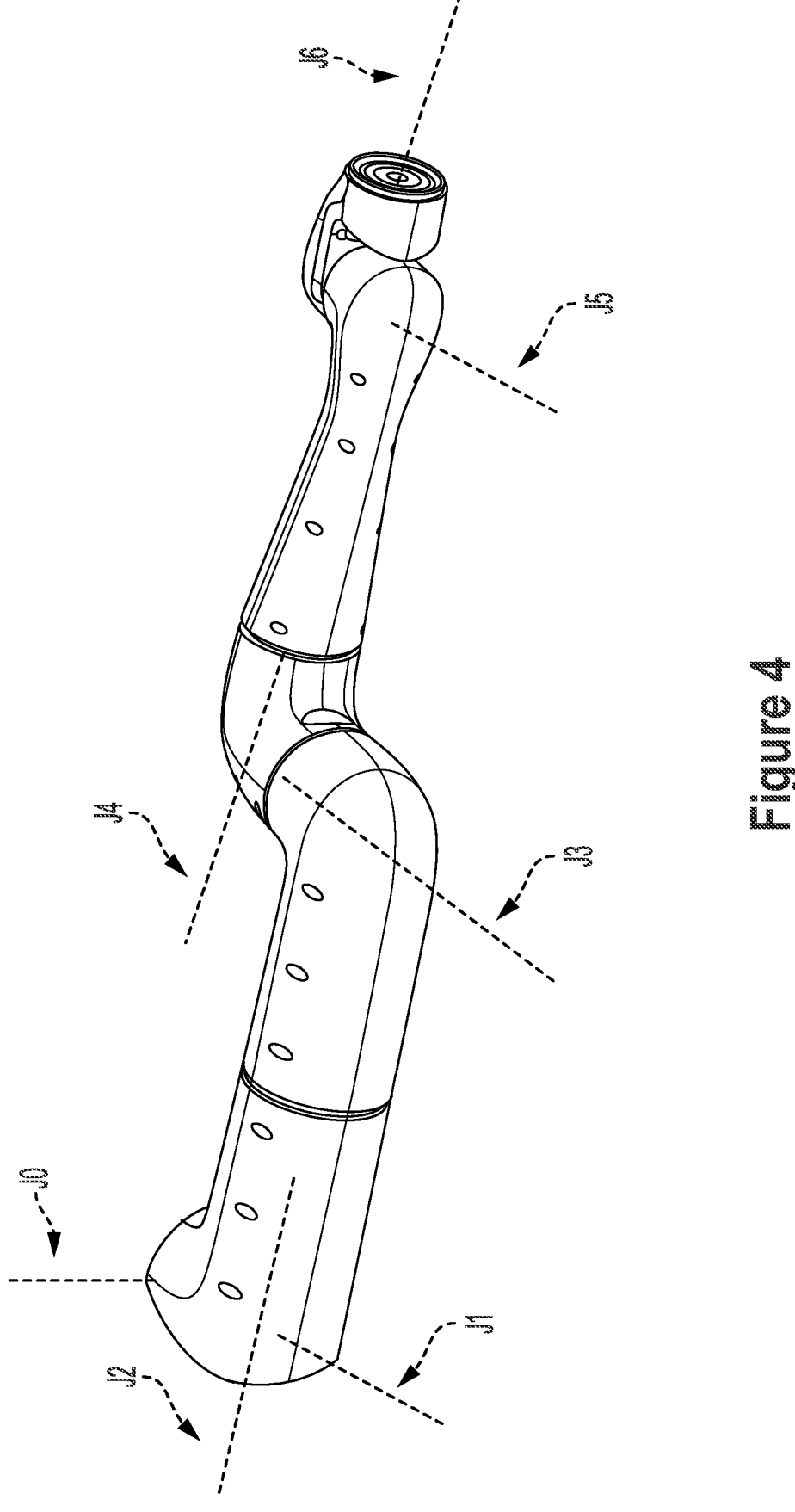
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5:
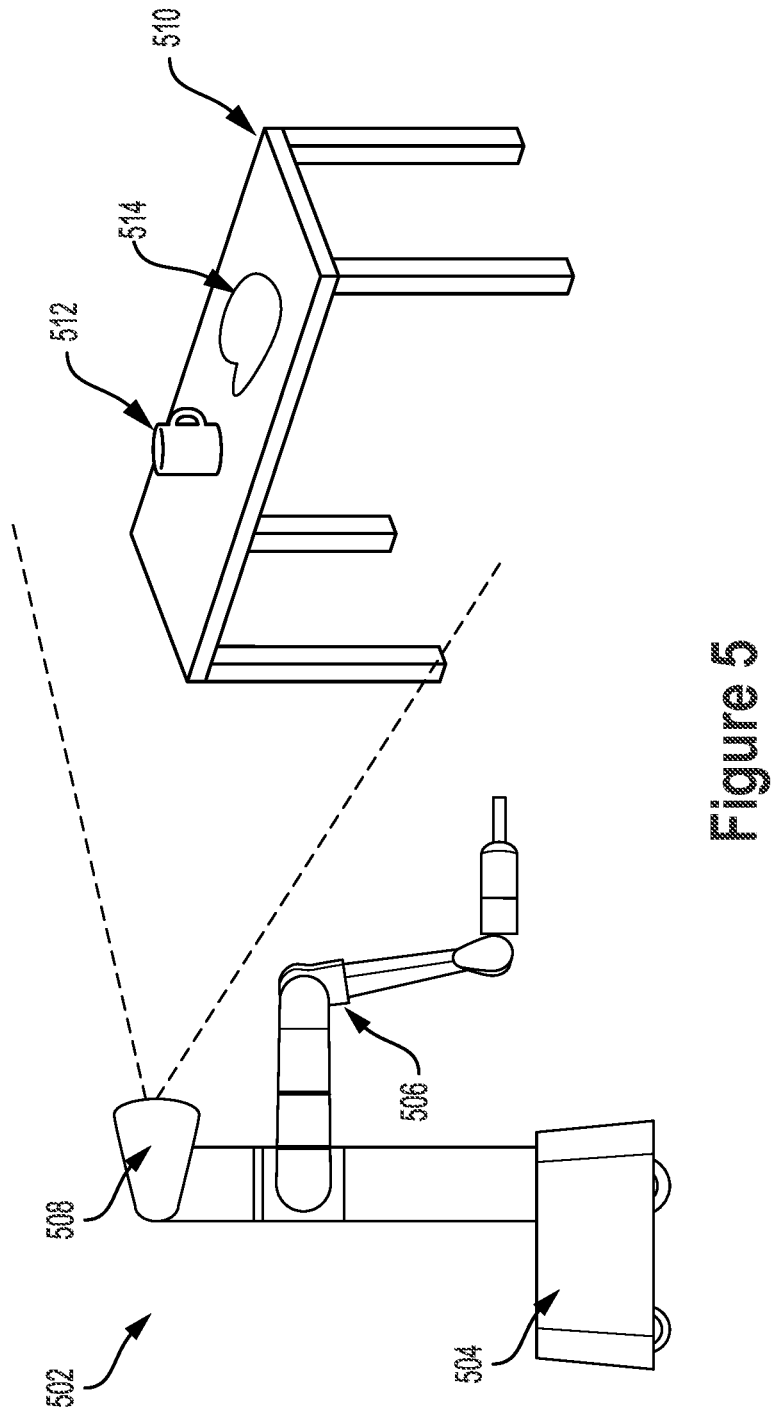
FIG. 5 is a side view of a robot capturing image data representative of an environment, in accordance with example embodiments.

FIG. 5 is a side view of a robot capturing image data representative of an environment, in accordance with example embodiments. More specifically, a robot 502 including a robot base 504, a robot arm 506, and perception housing 508 may operate within an environment. In order to control the robot 502, a robot control system may receive image data captured by one or more sensors in the perception housing 508. In order to interpret the surrounding environment to enable the robot 502 to perform tasks in the environment, the robot control system may apply one or more machine learning models to the captured image data. In some examples, the image data may be red green blue depth (RGBD) data, which includes both color and depth information. The RGBD data may be generated using one sensor or multiple separate sensors. In further examples, one or more machine learning models may be applied to red green blue (RGB) color images. In yet further examples, one or more machine learning models may be applied to three-dimensional grayscale depth data. One or more machine learning models may be applied to other types of sensor data representative of the environment as well or instead.

In some examples, the robot 502 may be controlled to interact with one or more features (e.g., objects or surfaces) in the surrounding environment. For example, robot 502 may be controlled to utilize an end effector of robot arm 506, such as a gripper, to interact with the environment. In reference to FIG. 5, the environment includes a table 510, which holds a mug 512 and a liquid spill 514. The robot 502 may capture image data that includes the table 510 and its contents. The robot 502 may then attempt to process the image data in order to perform one or more robot tasks. Different robot tasks may require different information about the features (e.g., objects or surfaces) in the surrounding environment.

As an example, the robot 502 may be tasked with identifying tidiable areas in the environment. A machine learned model may be employed to take image data as input and output tidiable areas for the robot 502. For instance, the model may identify the liquid spill 514 as a tidiable area. If the mug 512 is empty, the model may also identify the mug 512 as a tidiable portion of the environment that should be cleared. Given that the areas that should be tidied by the robot 502 may depend on user preferences, a machine learned model may be used to help the robot 502 learn what portions of the environment on which to perform tidying operations. User feedback (either in simulation or in the physical world) may be used to help train the model.

As another example, the robot 502 may instead be tasked with organizing objects in the environment, such as the mug 512. In order to perform this task, the robot 502 may need to first identify graspable areas in the environment, such as the handle of the mug 512. It may not be readily apparent which objects or which portions of the objects are graspable by a gripper of the robot 502. Additionally, there may be a risk of damaging objects if the objects are grasped in a suboptimal manner. Accordingly, it may be advantageous to apply a machine learning model which processes image data of the environment and identifies graspable areas for the robot 502. In this example, identifying graspable areas of objects in the environment may be considered a robot vision tasks corresponding to the robot task of picking up and organizing objects in the environment.

As a further example, the robot 502 may instead be tasked with identifying wipeable areas in the environment to wipe down with a different end effector (e.g., a duster rather than a gripper). It may not be readily apparent which surfaces can or should be wiped down by the robot 502. For instance, it may not be obvious which surfaces are relatively permanent and thus likely to collect dust. Accordingly, it may be advantageous to apply a machine learning model to identify wipeable surfaces in the environment to help control the robot 502 to perform a task involving dusting or otherwise wiping down the surfaces.

The illustrative robot tasks of tidying, organizing objects, and wiping down surfaces may each require an understanding of the environment, including the locations and types of features (e.g., objects and surfaces). In order to become proficient at providing a useful task-specific output to control the robot 502, a machine learning model may need to be trained on many images captured by the robot 502 or a similar robot. In the course of this training, the model may be trained to determine robust sets of feature values for input images. The features values may then be used to generate a task-specific output. In examples described herein, these feature values as well as the training work that allowed for the determination of such feature values may be leveraged to allow the robot 502 to efficiently obtain task-specific output for other robot vision tasks. For instance, if a model is trained to allow the robot 502 to accurately perform tidying operations in an environment, the trained model may then be leveraged in combination with task-specific heads to also produce task-specific outputs to assist the robot 502 in performing other tasks, such as organizing objects, wiping down surfaces, as well as other robot tasks involving more logically distinct perception tasks.

Figure 6A:
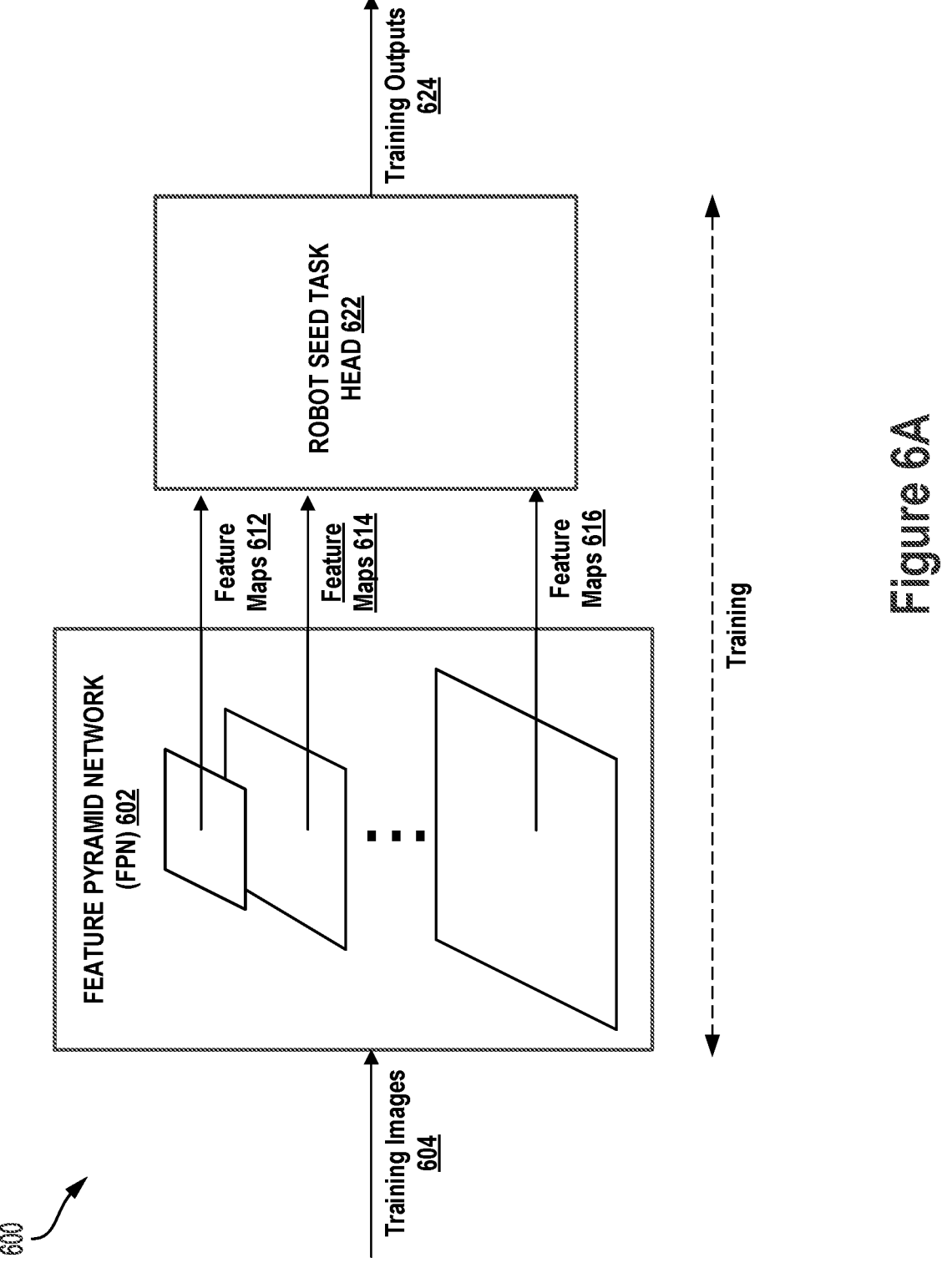
FIG. 6A illustrates training of a feature pyramid network, in accordance with example embodiments.
Figure 6B:
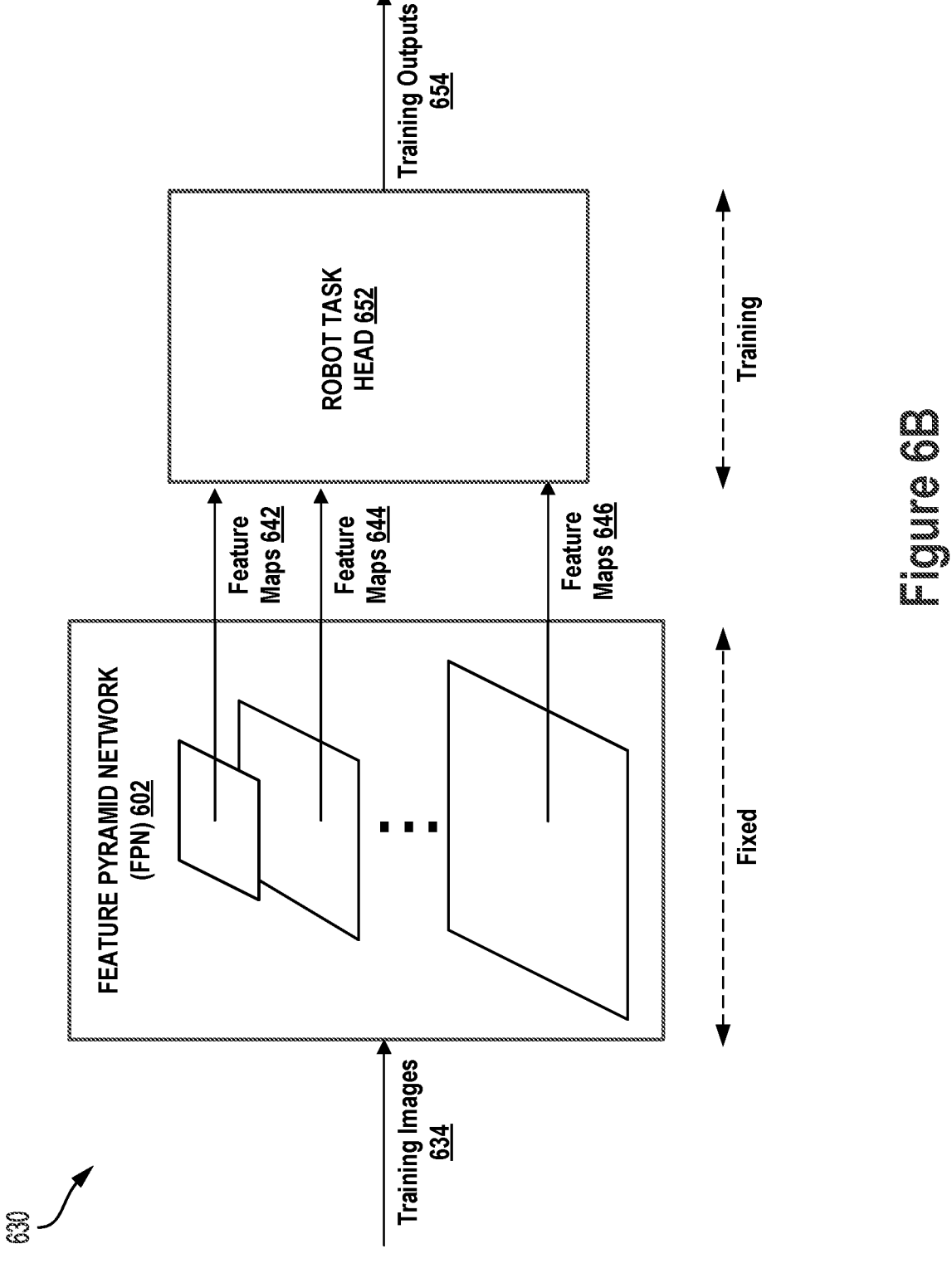
FIG. 6B illustrates training of a robot task head, in accordance with example embodiments.
Figure 6C:
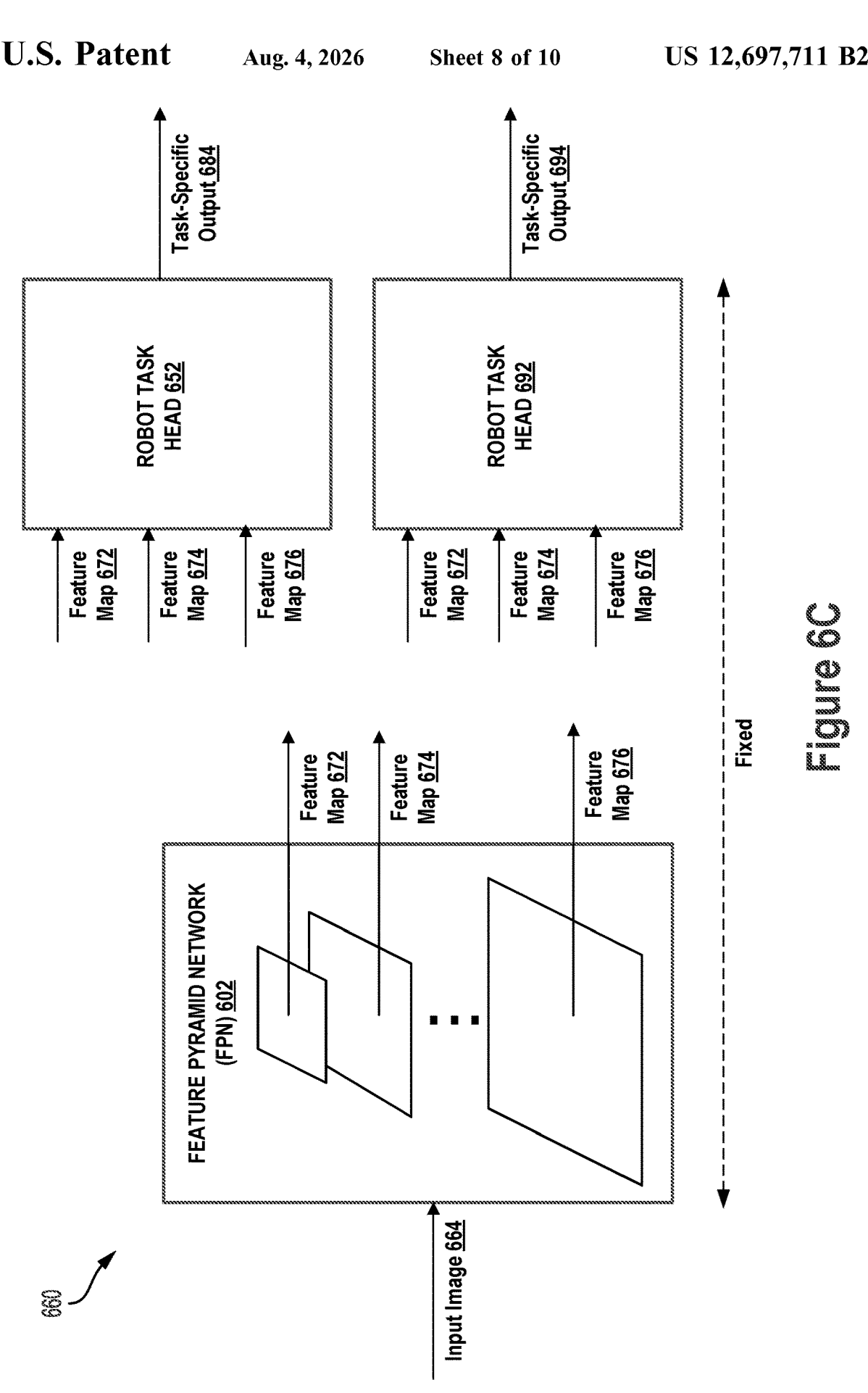
FIG. 6C illustrates runtime application of multiple robot task heads, in accordance with example embodiments.

FIG. 6A-6C collectively illustrate the process of training and applying an FPN with robot task-specific heads. In the illustrated example, a shared dense network takes the form of an FPN, which may be particularly advantageous to employ different resolutions to handle features of different sizes. In other examples, a different type of dense network may be used, such as a convolutional neural network (CNN). The shared network may be referred to as a dense network to signify that the network has more layers than the task-specific heads. In some examples such as the one illustrated, the dense shared network may be configured to generate feature values in the form of one or more feature maps which correspond to captured image data. In other examples, the feature values may take on a different form, such as values associated with nodes of hidden layers of a neural network.

In reference to FIG. 6A, an FPN 602 may initially be trained using a seed robot task as illustrated by information flow 600. In order to train the FPN 602, training data may be accumulated which includes image data of the environment and corresponding task-specific outputs for the seed task. For instance, in some examples, the seed task may involve identifying tidiable areas of the environment, in which case the task-specific output may indicate whether an area captured in a particular image is tidiable or not. Other types of robot perception tasks may also be used as the seed task as well or instead. In general, a robot perception task for which a wide variety of image data and corresponding desired output is available may be effective for initially training the FPN 602 to develop a rich feature set which may then be employed by other task-specific heads.

FIG. 6A illustrates training of FPN 602 in combination with robot seed task head 622 using training images 604 and corresponding training outputs 624 as part of information flow 600. The training images 604 may be captured or determined using one or more sensors on one or more robots, such as RGB cameras and/or stereo cameras. In some examples, the training images 604 may be RGBD images. The training outputs 624 may be determined based on labels provided by human users in the physical world and/or in simulation. In other examples, the training outputs 624 may be determined by a robot based on experimentation. Some or all of the training data may also be provided by an external source (e.g., by using a publically accessible image data set).

The FPN 602 is a feature extractor designed to detect features at different scales, which may be useful for a wide variety of different robot tasks involving robot interactions with the surrounding environment. The FPN 602 may be configured to compute convolutional feature maps at different resolutions for a single input image. The fully convolutional nature of the FPN 602 enables the network to take an image of an arbitrary size and output proportionally sized feature maps at multiple levels in the feature pyramid. Higher level feature maps contain grid cells that cover larger regions of the image and are therefore more suitable for detecting larger features. Furthermore, grid cells from lower level feature maps may be more effective for detecting smaller features.

The FPN 602 may be configured to generate respective feature maps 612, 614, and 616 for each training image of training images 604. Any number of different resolutions of feature maps may be generated. Furthermore, any or all of the features maps 612, 614, and 616 may be used independently or in combination to allow robot seed task head 622 to make predictions about the environment. The robot seed task head 622 may contain additional layers that allow for the generation of a task-specific output for one or more inputted feature maps. In some examples, the robot seed task head 622 may be a CNN which contains fewer convolutional layers than the FPN 602. During the training of the FPN 602, both the FPN 602 and the robot seed task head 622 may be trained simultaneously to map training images 604 to corresponding outputs of training outputs 624. During the training phase illustrated in FIG. 6A, the FPN 602 may be trained to generate rich feature maps 612, 614, and 616 which may be leveraged both by robot seed task head 622 as well as other robot task heads with relatively additional work required.

FIG. 6B illustrates the training of a particular robot task head after the FPN 602 has been trained. In some examples, the workflow 630 may be performed on demand to quickly train a new robot task head 652 to enable a robot to quickly learn how to perform a new task in the environment. Additional training data in the form of training images 634 and training outputs 654 may be used to train robot task head 652. The training outputs 654 may be associated with a different robot task than the seed task (e.g., identifying graspable areas of the environment instead of tidiable areas of the environment). During the workflow 630, the FPN 602 may be fixed so that the training images 634 and training outputs 654 do not change how the FPN 602 generates feature maps 642, 644, and 646. Accordingly, only layers of robot task head 652 may be adjusted in order to better map the training images 634 to the training outputs 654 based on the feature maps 642, 644, and 646 generated by the FPN 602. Because the FPN 602 may have already been trained to generate rich feature maps, the robot task head 652 may require relatively few layers to produce accurate results, particularly where the robot task head 652 is associated with a similar robot vision task as the initial seed task used to train the FPN 602. The result of the workflow 630 illustrated in FIG. 6B may be that the robot task head 652 is effectively trained to operate on feature maps from FPN 602 to produce task-specific outputs useful for the robot to perform a different task than originally used to train the FPN 602.

FIG. 6C illustrates runtime application of multiple robot task heads, in accordance with example embodiments. More specifically, after an FPN 602 and one or more task-specific heads have been trained, the FPN 602 and one or more task-specific heads may be applied at runtime by the robot to generate task-specific output that may be used to control the robot. In particular, the robot may capture an input image 664 and feed the input image 664 into FPN 602 to generate feature maps 672, 674, and 676. The feature maps 672, 674, 676 may be input into multiple different robot task heads, including robot task head 652 to produce task-specific output 684 and robot task head 692 to produce task-specific output 694. Notably, a computational benefit may be obtained over using separate networks for the two robot tasks associated with robot task head 652 and robot task head 692 because the FPN 602 only needs to be applied to the input image 664 by the robot once at runtime. Then, robot task head 652 and robot task head 692 which each contain relatively few layers may separately be applied to the feature maps 672, 674, and 676 generated by FPN 602.

In further examples, more than two robot task heads may be used by a robot simultaneously. In some examples, the particular robot task heads which are active (and therefore applied to features from a shared dense network) may be adjusted on the fly by a robot control system and/or by a separate user control system. In further examples, developers may be provided with a programming interface that allows for dynamic activation and deactivation of specific robot task heads to conserve resources. Although not illustrated in FIG. 6C, one or more robot task heads may also be retrained on the fly, for instance, based on the robot's effectiveness in performing a desired task.

Figure 7:
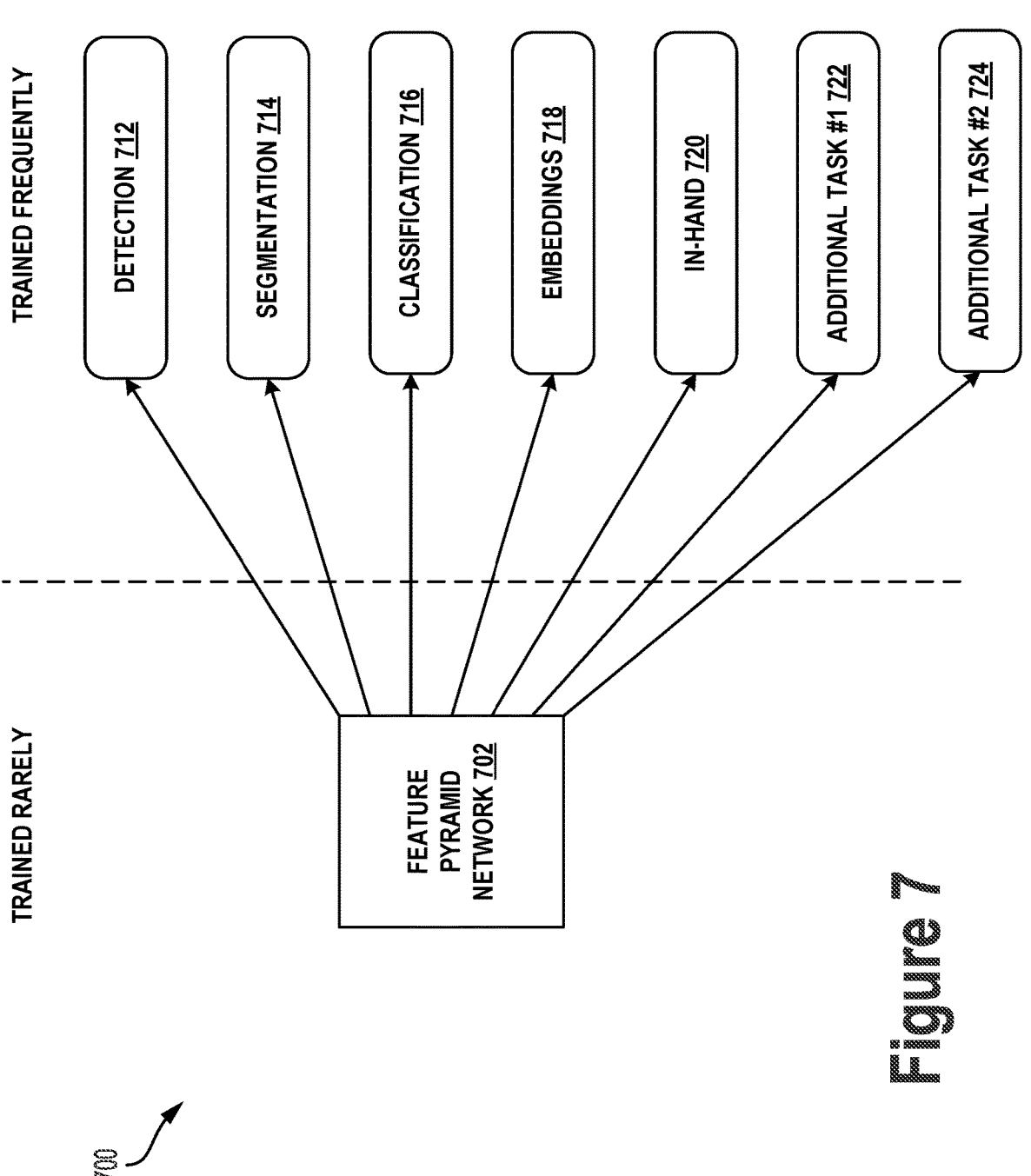
FIG. 7 is a system design diagram, in accordance with example embodiments.

FIG. 7 is a system design diagram, in accordance with example embodiments. More specifically, a system arrangement 700 of software modules may be deployed on a robotic device to allow for the efficient generation of different types of task-specific outputs. The FPN 702 may be a shared dense network that is trained relatively infrequently (e.g., once a week, once a month, or once a quarter). In some examples, the FPN 702 may periodically be swapped out with a different model (e.g., a more sophisticated version) while only have to make changes to one or more initial layers of the different model for retraining. In further examples, a different type of shared dense network may also be used.

The system arrangement 700 includes a number of separate robot task-specific heads, including detection 712, segmentation 714, classification 716, embeddings 718, in-hand 720, additional task #1 722, and additional task #2 724. The arrangement 700 is provided for purposes of illustration. More or fewer task-specific heads, including different combinations of task-specific heads, may also be used in a robot vision system with a shared dense network in other examples. Locking the FPN 702 may allow for frequent training (e.g., daily retraining) of the task-specific heads without having to coordinate with other task-specific heads. Additionally, the task-specific heads may be kept relatively small and fast to execute so that the FPN 702 does most of the heavy lifting only once for each input image.

In a further runtime enhancement, all the layers of the FPN 702 may be kept on a graphics processing unit (GPU) of a computing device such as a robot control system. This arrangement may avoid almost all copies required from the GPU to a central processing unit (CPU). By contrast the layers of the task-specific heads such as those illustrated in FIG. 7 may be kept on the CPU.

Referring back to FIG. 7, detection 712 refers to a task-specific head that generates bounding boxes around features that may be relevant for robot tasks. Segmentation 714 refers to a pixelwise instance mask for each bounding box associated with a feature. Notably, segmentation 714 may take the output of detection 712 as an input in addition to the output of the FPN 702. Other types of hierarchical arrangements where a task-specific head takes as input the output from a different task-specific head may also be used in various examples. Segmentation 714 may be done at the instance level (e.g., all pixels associated with a particular wall) or at the semantic level (e.g., all pixels associated with any walls in the environment). Classification 716 refers to associating a feature with a particular class out of a plurality of possible classes for which the system is trained. Embeddings 718 refers to class-related or instance-related information that may be used to help identify or interpret a feature.

Additionally, in-hand 720 refers to identifying an object in the gripper of the robot. In further examples, a task-specific head may instead be configured to identify any object that is partially occluded by a portion of the robot. In yet further examples, a task-specific head may instead be configured to identify an object that is partially occluded by a different specific part of the robot than the robot's gripper.

Arrangement 700 may additionally include additional task-specific heads 722 and 724. In some examples, the additional tasks may relate to identifying respective particular types of objects. One or more of the types of objects may be objects the robot can manipulate to enter or exit an area. The objects may be manipulatable by the robot to open or close a door. For instance, task-specific head 722 may relate to identifying door handles and task-specific head 724 may relate to identifying elevator buttons. In such examples, each of the task-specific heads 722 and 724 may take the output from, e.g., detection 712 in addition to the FPN 702. Using separate robot task heads for identifying relatively small objects of particular importance to a robot's operation may be beneficial where a more general object detector may be unlikely to become sufficiently proficient at handling objects of a wide variety of different sizes and types.

In a further example, additional task-specific head 722 and 724 may each refer to different manners in which the robot can manipulate the environment. For instance task-specific head 722 may refer to identifying graspable areas of the environment for the robot while task-specific head 724 may refer to identifying wipeable areas of the environment for the robot. In such examples, each task-specific head 722 and 724 may be associated with a task involving a different end effector of the robot. For instance, task-specific head 722 may involve a gripper while task-specific head 724 may involve a duster. In additional examples, the task-specific heads 722 and 724 may relate to other ways in which the robot can manipulate the environment, such as by identifying pushable areas and pullable areas, respectively.

In some examples, the set of task-specific heads associated with the arrangement 700 may be adjusted on the fly. For instance, individual task-specific heads may be activated or deactivated, which may allow for the conservation of resources. In further examples, individual task-specific heads may be trained by the robot on the fly as well or instead.

FIG. 8 is a block diagram of a method, in accordance with example embodiments. In some examples, method 800 of FIG. 8 may be carried out by a control system, such as control system 118 of robotic system 100. In further examples, method 500 may be carried by one or more processors, such as processor(s) 102, executing program instructions, such as program instructions 106, stored in a data storage, such as data storage 104. Execution of method 800 may involve a robotic device, such as illustrated and described with respect to FIGS. 1-4. Other robotic devices may also be used in the performance of method 800. In further examples, some or all of the blocks of method 800 may be performed by a control system remote from the robotic device. In yet further examples, different blocks of method 800 may be performed by different control systems, located on and/or remote from a robotic device. In additional examples, different blocks of method 800 may be performed by separate robotic devices.

At block 810, method 800 includes receiving image data representing an environment of a robotic device from a camera on the robotic device. In some examples, the image data comprises RGBD data. The image data may be received from one or more multiple sensors. In further examples, the image data may be processed (e.g., by fusing together sensor data from multiple different perception sensors of different types) before the image data is used as an input to a machine learning model.

At block 820, method 800 further includes applying a trained dense network to the image data to generate a set of feature values. The trained dense network may have been trained to accomplish a first robot vision task. In some examples, the trained dense network may be an FPN. In further examples, the trained dense network has been trained using image data from one or more other robotic devices having a same or similar camera as the camera of the robotic device. In some examples, the first robot vision task may involve determining whether an area of the environment is robotically manipulatable. Other types of robot vision tasks may be used as the seed task as well or instead.

At block 830, method 800 additionally includes applying a trained task-specific head to the set of feature values to generate a task-specific output to accomplish a second robot vision task. The trained task-specific head may have been trained to accomplish the second robot vision task based on previously generated feature values from the trained dense network. The second robot vision task may be different from the first robot vision task. In some examples, the trained dense network has more network layers than the trained task-specific head. In some examples, the trained task-specific head is applied to both the set of feature values and a different task-specific out from a different task-specific head.

At block 840, method 800 further involves controlling the robotic device to operate in the environment based on the task-specific output generated to accomplish the second robot vision task. For example, the robotic device may be controlled to pick up or otherwise manipulate an object, enter or exit an area, or otherwise interact with the robotic device's surrounding environment.

In additional examples, the first robot vision task involves determining whether a first type of robotic manipulation is performable on the environment and the second robot vision task involves determining whether a second type of robotic manipulation is performable on the environment. In such examples, the first type of robotic manipulation may involve a first robotic manipulator and the second type of robotic manipulation may involve a second robotic manipulator.

In further examples, the trained task-specific head is one of at least three trained task-specific heads corresponding to respective functions of detection, segmentation, and classification. In additional examples, the second robot vision task for the trained task-specific head involves determining whether an object is partially occluded by a portion of the robotic device. In further examples, the second robot vision task for the trained task-specific head involves determining whether an object is in a gripper of the robotic device.

In additional examples, the trained task-specific head is one of a plurality of trained task-specific heads corresponding to identifying a plurality of respective object types. The plurality of respective object types may include at least one object type that is robotically manipulatable to enable the robotic device to enter or exit an area in the environment. More specifically, the at least one object type may be robotically manipulatable to open or close a door in the environment. For instance, one object type associated with one task-specific head may be a door handle while another object type associated with another task-specific head may be an elevator button.

In some examples, a control system of the robotic device may be configured to periodically adjust which of the plurality of task-specific heads are active. In additional examples, layers of the trained dense network are processed by a GPU of the robotic device and layers of the trained task-specific head are processed by a CPU of the robotic device. Examples described herein may further involve periodically retraining the trained task-specific head without changing the training dense network.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
receiving a trained network and a first trained task-specific head, wherein the trained network has been trained to generate feature values based on image data, and wherein the trained network and a first trained task-specific head have been trained to accomplish a first robot task, wherein the first trained task-specific head takes as an input the feature values from the trained network and generates a first task-specific output to facilitate performance of the first robot task;
fixing the trained network;
receiving first image data representing an environment of a robotic device from a camera on the robotic device;
training a second task-specific head based on the first image data to generate a second task-specific output to accomplish a second robot task, wherein the second task-specific head is trained to accomplish the second robot task based on feature values generated by the trained network, wherein the second trained task-specific head takes as an input the feature values from the trained network and generates the second task-specific output to facilitate performance of the second robot task, wherein the second trained task-specific head is trained to accomplish the second robot task after the trained network and the first trained task-specific head were trained to accomplish the first robot task, and wherein during said training of the second task-specific head, the trained network is fixed so that the first image data and the second task-specific output do not change how the trained network generates the feature values; and
outputting the second trained task-specific head.

2. The method of claim 1, wherein the trained network is a feature pyramid network (FPN).

3. The method of claim 1, further comprising periodically retraining the first or second trained task-specific head without changing the trained network.

4. The method of claim 1, wherein the trained network has more network layers than each of the first trained task-specific head and the second trained task-specific head.

5. The method of claim 1, wherein the trained network has been trained using image data from one or more other robotic devices having a same or similar camera as the camera of the robotic device.

6. The method of claim 1, wherein the first or second trained task-specific head is one of a plurality of trained task-specific heads corresponding to identifying a plurality of respective object types.

7. The method of claim 1, wherein a control system of the robotic device comprises a plurality of task-specific heads, wherein the method further comprises periodically adjusting which of the plurality of task-specific heads are active.

8. The method of claim 1, wherein the second trained task-specific head is applied to both the set of feature values and a different task-specific output from a different task-specific head.

9. The method of claim 1, wherein the image data comprises red green blue depth (RGBD) data.

10. The method of claim 1, wherein layers of the trained network are processed by a graphics processing unit (GPU) of the robotic device, and wherein layers of the first trained task-specific head or the second trained task-specific head are processed by a central processing unit (CPU) of the robotic device.

11. A method comprising:
receiving image data representing an environment of a robotic device from a camera on the robotic device;
applying a trained network to the image data to generate a set of feature values, wherein the trained network and a first trained task-specific head have been trained to accomplish a first robot task, wherein the first trained task-specific head takes as an input the feature values from the trained network and generates a first task-specific output to facilitate performance of the first robot task;
applying a second trained task-specific head to the set of feature values to generate a task-specific output to accomplish a second robot task, wherein the second trained task-specific head has been trained to accomplish the second robot task based on previously generated feature values from the trained network, wherein the second trained task-specific head takes as an input the previously generated feature values from the trained network and generates a second task-specific output to facilitate performance of the second robot task, wherein the second trained task-specific head was trained to accomplish the second robot task after the trained network and the first trained task-specific head were trained to accomplish the first robot task, and wherein during said training of the second trained task-specific head, the trained network is fixed so that the image data and the second task-specific output do not change how the trained network generates the feature values; and
controlling the robotic device to operate in the environment based on the task-specific output generated to accomplish the second robot task.

12. The method of claim 11, wherein the trained network is a feature pyramid network (FPN).

13. The method of claim 11, further comprising periodically retraining the first or second trained task-specific head without changing the trained network.

14. The method of claim 11, wherein the trained network has more network layers than each of the first trained task-specific head and the second trained task-specific head.

15. The method of claim 11, wherein the trained network has been trained using image data from one or more other robotic devices having a same or similar camera as the camera of the robotic device.

16. The method of claim 11, wherein a control system of the robotic device comprises a plurality of task-specific heads, wherein the method further comprises periodically adjusting which of the plurality of task-specific heads are active.

17. The method of claim 11, wherein the second trained task-specific head is applied to both the set of feature values and a different task-specific output from a different task-specific head.

18. The method of claim 11, wherein the image data comprises red green blue depth (RGBD) data.

19. The method of claim 11, wherein layers of the trained network are processed by a graphics processing unit (GPU) of the robotic device, and wherein layers of the first trained task-specific head or the second trained task-specific head are processed by a central processing unit (CPU) of the robotic device.

20. A robotic device comprising a control system configured to:

receive image data representing an environment of a robotic device from a camera on the robotic device;

fix a trained network;

apply the trained network to the image data to generate a set of feature values, wherein the trained network and a first trained task-specific head have been trained to accomplish a first robot task, wherein the first trained task-specific head takes as an input the feature values from the trained network and generates a first task-specific output to facilitate performance of the first robot task;

apply a second trained task-specific head to the set of feature values to generate a task-specific output to accomplish a second robot task, wherein the second trained task-specific head has been trained to accomplish the second robot task based on previously generated feature values from the trained network, wherein the second trained task-specific head takes as an input the previously generated feature values from the trained network and generates a second task-specific output to facilitate performance of the second robot task, wherein the second trained task-specific head was trained to accomplish the second robot task after the trained network and the first trained task-specific head were trained to accomplish the first robot task, and wherein during said training of the second task-specific head, the the trained network is fixed so that the image data and the second task-specific output do not change how the trained network generates the feature values; and control the robotic device to operate in the environment based on the task-specific output generated to accomplish the second robot task.

* * * * *